United States Patent [19]

Tatsuguchi

[11] 4,322,748
[45] Mar. 30, 1982

[54] HIGH-SPEED REPRODUCING SYSTEM IN APPARATUS FOR REPRODUCING INFORMATION SIGNALS RECORDED ON A ROTARY RECORDING MEDIUM

[75] Inventor: Kazuo Tatsuguchi, Yokohama, Japan

[73] Assignee: Victor Company of Japan, Ltd., Yokohama, Japan

[21] Appl. No.: 148,014

[22] Filed: May 8, 1980

[30] Foreign Application Priority Data

May 9, 1979 [JP] Japan .................................. 54-55723
May 31, 1979 [JP] Japan .................................. 54-67967

[51] Int. Cl.³ .......................... H04N 5/76; G11B 21/08
[52] U.S. Cl. ..................................... 358/128.5; 369/43
[58] Field of Search .......................... 358/128.5, 128.6; 179/100.1 G, 100.3 D, 100.3 V, 100.3 B; 360/10, 77; 369/32, 33, 43, 47

[56] References Cited

U.S. PATENT DOCUMENTS

| | | | |
|---|---|---|---|
| Re. 29,963 | 4/1979 | Janssen ........................ | 179/100.3 B |
| 3,911,211 | 10/1975 | Rennick ....................... | 179/100.3 V |
| 3,973,080 | 8/1976 | Dickopp et al. ............... | 358/128.5 |
| 4,057,832 | 11/1977 | Kappert ....................... | 179/100.1 G |
| 4,152,727 | 5/1979 | Tatsuguchi et al. .......... | 179/100.1 G |
| 4,189,758 | 2/1980 | Morio et al. ................. | 360/77 |

*Primary Examiner*—James W. Moffitt
*Assistant Examiner*—Donald McElheny, Jr.

*Attorney, Agent, or Firm*—Louis Bernat

[57] ABSTRACT

A high-speed reproducing system is employed in an apparatus for reproducing signals from a rotary recording medium having an information signal recorded in the track formed thereon in a spiral path or a concentric circular form and having reference signals recorded thereon interrelatedly with the information signal track, the high-speed reproducing system comprises a reproducing transducer having a reproducing element for reproducing the information signal and the reference signals recorded on the rotary recording medium, and tracking control mechanism for accomplishing tracking control so that the reproducing element traces the information signal track, a feeding mechanism for feeding the reproducing transducer in a feeding travel over the rotary recording medium, with transducer movement in the radial direction thereof, a circuit for producing a tracking control signal in response to the reference signals reproduced by the reproducing transducer and for supplying the tracking control signal to the tracking control mechanism, and a shift pulse generating circuit for generating a train of shift pulses having a desired repetitive frequency and for supplying the shift pulses to the tracking control mechanism. The reproducing element is shifted to trace an adjacent track sequentially every time when the shift pulse is supplied to the tracking control mechanism.

6 Claims, 16 Drawing Figures

HIGH-SPEED REPRODUCING SYSTEM IN APPARATUS FOR REPRODUCING INFORMATION SIGNALS RECORDED ON A ROTARY RECORDING MEDIUM

BACKGROUND OF THE INVENTION

The present invention relates generally to high-speed reproducing systems in apparatuses for reproducing information signals recorded on rotary recording mediums, and more particularly to a system for reproducing, at high-speed, recorded information for the purpose of searching for the position of a specifically desired information content from among information contents recorded on the rotary recording medium.

Known system for recording and reproducing information signals (such as video signals and/or audio signals) on and from disc-shaped, rotary mediums (referred to hereinafter simply as "discs") are broadly divided into system using optical reproduction, systems using a reproducing stylus employing a piezoelectric element, and systems utilizing variations in the electrostatic capacitance between an electrode on the reproducing stylus and the recorded surface of the disc.

In accordance with a known electrostatic capacitance system, recording is accomplished by forming a spiral guide groove in the disc for guiding the reproducing stylus. As the same time, pits are formed in responsive correspondence with an information signal as it is recorded on the bottom surface of the groove. In the reproducing system, the reproducing stylus is guided by the guide groove. The stylus traces the track within the groove and reproduces the signal in response to variations in the electrostatic capacitance.

In this known system, however, a reproducing stylus guiding groove is provided on the disc. The reproducing stylus is compulsorily guided by this guide groove. It is not possible for such a reproducing stylus to undergo relocation operations such as riding over the groove wall of one track, moving into another track and returning to the original track. If the reproducing stylus were to be forced to undergo such an operation, the groove and the stylus would be damaged. For this reason, it has not been possible in this known, groove type, system to carry out special reproduction such as quick-motion picture reproduction, slow-motion picture reproduction, still-picture reproduction, and random access motion.

Accordingly, with the aim of overcoming the various problems of the known systems described above, a novel "Information signal recording and reproducing system" is disclosed in the specification of U.S. patent application Ser. No. 785,095, filed Apr. 6, 1977. According to this system, the recording system forms pits in accordance with the information signal being recorded along a spiral track on a flat disk shaped recording medium, without forming a groove therein. In the reproducing system, a reproducing stylus traces over and along this track, thereby reproducing the recorded information signal in response to variations in the electrostatic capacitance.

In this system, there is no groove for guiding the reproducing stylus on the disc; therefore, pilot or reference signals should be recorded on or in the vicinity of a track of information signal, such as a video signal, on a rotary disc. At the time of reproducing, the reference signals are reproduced together with the video signal. Tracking servo control is carried out so that the reproducing stylus traces accurately along the track in response to the reproduced reference signals.

By the use of this previously described system, the recording track has no groove. There is no possibility whatsoever of the reproducing stylus or the recording medium being damaged by crosstrack stylus movement. The stylus can trace the same portion of the track repeatedly many times, with a so-called random access motion, wherein a reproducing stylus is moved at high-speed to a desired position on a disc to reproduce a desired information. In addition, a special reproduction such as still, slow motion, or quick motion reproduction becomes possible.

Already known are systems for quickly shifting the reproducing stylus to the position of a specifically desired information signal recorded on a disc and commencing reproduction from that position. One of these systems is the random access system in which address signals are used. Another system is the so-called "live search" system wherein, as the reproduced picture is observed, the reproducing stylus is shifted at high-speed until the desired image is obtained.

Of these systems, the random access system makes use of address signals respectively recorded on all track turns of the disc, and the reproducing stylus is shifted as it reproduces these address signals. Then, when the reproduced address signal coincides with the address of the desired designation, the movement of the reproducing stylus is stopped.

One example of this random access system is described in detail in the specification of U.S. patent application Ser. No. 962,795, filed Nov. 21, 1978, entitled "Random access system in a rotary recording medium reproducing apparatus", now abandoned and replaced by U.S. patent application Ser. No. 156,118, filed June 3, 1980.

However, while this random access system has an advantage in that the reproducing stylus can be shifted accurately, positively, and quickly to any desired position, it has a drawback in that its reproducing apparatus tends to become relatively complicated and expensive.

In contrast, the above mentioned live search system does not employ address signals and does not require components such as circuits for reference to and attaining coincidence with address signals, whereby its reproducing apparatus is advantageously inexpensive.

However, since merely shifting the reproducing stylus at high-speed in the radial direction of the disc will not bring the stylus onto a track in tracing state, a reproduced image cannot be obtained. Accordingly, in this live search system, it is also necessary to keep a tracking servo system as mentioned hereinbefore in an operating state to exercise control so that the reproducing stylus will trace along the track in the reproducing system. However, if the reproducing stylus is shifted at high-speed with the tracking servo system in its operating state, the reproducing stylus will undergo the following operation.

As the reproducing transducer including the reproducing stylus is fed at high-speed, the stylus undergoes tracking control up to the elastic deformation limit of parts such as the cantilever holding the stylus and the damper and maintains its state of tracing along one track turn. Thereafter, when the deformation of the above mentioned cantilever, damper, etc., exceeds the above mentioned limit, these parts are restored to their original natural state. For this reason, as a result of their elastic restoring force, the stylus skips over a number of hundreds, for example, of track turns and again traces by being tracking controlled along a new track turn. Thereafter, the above described operation is repeated.

As a consequence, the reproduced picture is formed by randomly reproduced information signals, at intervals of a number of hundreds of track turns. For this reason, the information content is missing at every interval of a few hundred track turns. Consequently, the movements of the reproduced image become intermittent, whereby it is impossible to determine accurately and positively the recorded position of the specifically desired information content. Another problem which arises is that, since the parts such as the cantilever and damper undergo repeated deformation up to the above mentioned limit and restoration, they are subjected to damage.

Another practice known in the art is to obtain a quick-motion reproduced image by forcibly shifting the reproducing stylus while it is tracing each track turn on the disc to the adjacent track turn during the vertical blanking period of every field of the video signal. By this system, however, in the case where a video signal for four fields, for example, is recorded along the track, and the stylus is shifted once during every vertical blanking period, a forward quick-motion reproduction of a maximum of quintupled speed is the limit, and the speed cannot be raised any higher. However, in order to search for and determine a specifically desired position on disc in a short time, it is necessary that a reproduced image varying with a speed which is 10 to 200 times that at the time of ordinary reproduction be obtainable as the reproduced image. For this reason, by this quick-motion system, the reproducing stylus cannot be shifted to a desired position in a very short time.

Accordingly, there has been a method wherein, by further expanding the above mentioned quick-motion operation, the reproducing stylus is shifted by a plurality of track turns within the above mentioned vertical blanking period. However, since a time of 0.2 to 0.3 milliseconds is required for the reproducing stylus to shift to the adjacent track turn, the vertical blanking period is exceeded in some cases by the period for the stylus to shift over a plurality of track turns. In such cases, a disturbance occurs in the reproduced image, and the picture quality deteriorates. Furthermore, even with this shifting of the stylus over a plurality of track turns every field of the video signal, searching for and determining a desired position cannot yet be accomplished with amply high-speed.

SUMMARY OF THE INVENTION

Accordingly, it is a general object of the present invention to provide a new and useful high-speed reproducing system in an apparatus for reproducing information signals recorded on rotary recording mediums.

Another and specific object of the invention is to provide a high-speed reproducing system in an apparatus for reproducing information signals recorded on rotary recording mediums. A reproducing stylus, being tracking controlled with respect to the track on the rotary recording medium (disc), smoothly shifts successively from one track turn to the adjacent track turn to reproduce, at high-speed, the content of information recorded on the disc. By this provision of the invention, although the quality of the reproduced picture is slightly lower than the quality in normal reproduction, a natural high-speed image is obtained as a whole. The position of any specifically desired image content can be accurately and positively determined as the picture being reproduced is observed.

Still another object of the invention is to provide a system in which a reproducing transducer, inclusive of a reproducing stylus, is fed at any speed in the radial direction of a rotary recording medium. In concert with this operation, the reproducing stylus is shifted successively from one track turn to the adjacent track turn to reproduce at high-speed the recorded information content.

A further object of the invention is to provide a system in which a reproducing stylus constituting a part of a reproducing transducer is shifted successively from one track turn to the adjacent track turn with any number of cycles per unit time. In concert with this operation, the transducer is fed in the radial direction of a rotary recording medium to reproduce, at high-speed, an information content recorded on the recording medium.

Other objects and further features of the invention will be apparent from the following detailed description with respect to preferred embodiments of the invention when read in conjunction with accompanying drawings.

DETAILED DESCRIPTION

Figure 1:
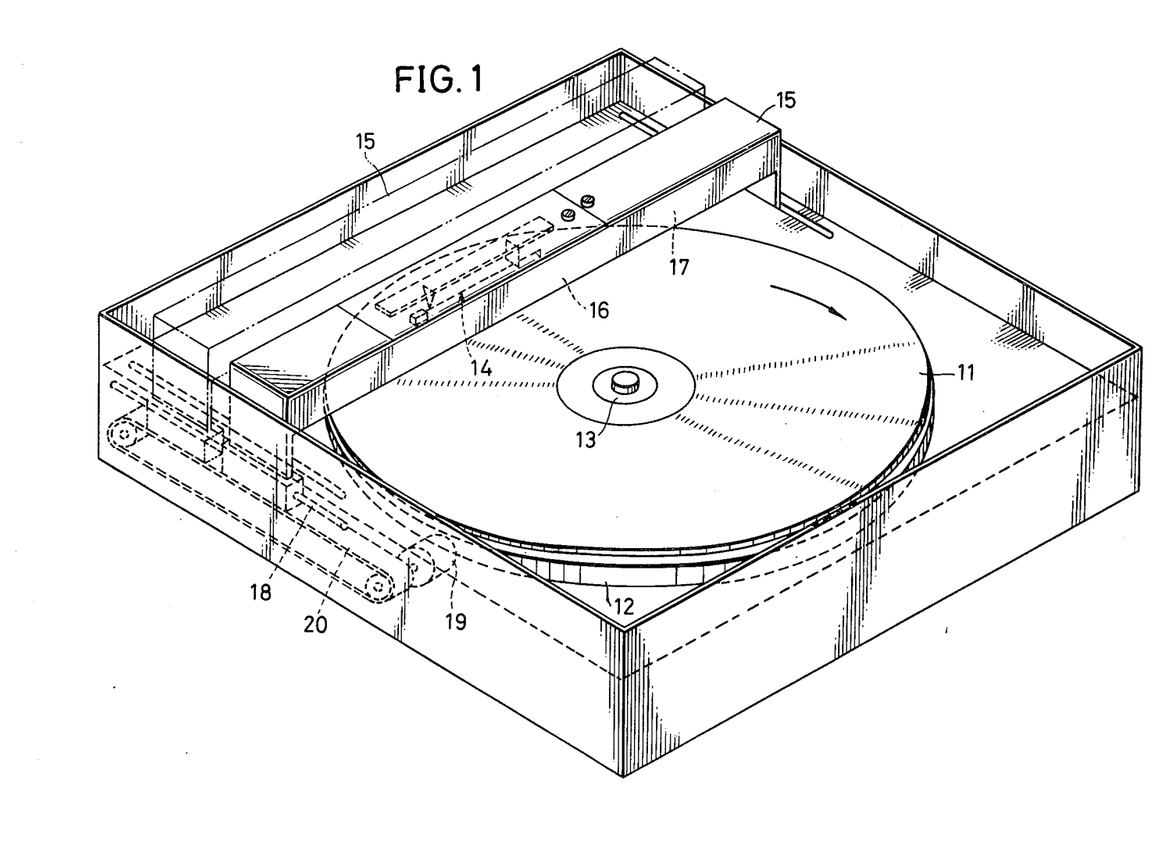
FIG. 1 is a perspective view of a rotary recording medium reproducing apparatus to which a high-speed reproducing system according to the present invention can be applied.

The general features of the exterior of a reproducing apparatus for reproducing a rotary recording medium, in which a high-speed reproducing system according to the invention can be applied, is illustrated in FIG. 1. In this apparatus, a rotary disc 11 is a rotary recording medium having a video signal recorded thereon. The disc 11 is set on and clamped to a turntable 12 by a clamper 13. The record disc is thus rotated unitarily with the turntable 12 at a rotational speed of 900 rpm, for example.

A signal pickup device 14, as a reproducing transducer, is mounted at a re-entrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known.

The carriage 15 is disposed horizontally above the turntable 12, and is guided at its ends by a pair of parallel horizontal guide bars 18 (only one is shown). This carriage 15, driven by an endless belt 20 driven by a motor 19, moves continuously in horizontal translation at a speed equal to the distance of one track pitch per revolution of the turntable 12, during a normal reproducing mode. Otherwise, the carriage may be driven by a feed screw driven by the motor 19. As a result of this movement of the carrier 15, a stylus of the signal pickup device 14 travels radially across the disc 11 and traces the spiral track of the disc 11 during rotation.

A video signal of, for example, two frames (that is, four fields) is recorded per each revolution, with spiral track of pits formed on the disc 11 responsive to the information content of the signal. One part of this track is shown in an enlarged scale in FIG. 2. Track turns of the single continuous spiral track, corresponding to each revolution of the disc 11, are designated as $t_1$, $t_2$, $t_3$ .... Each track turn is constituted by the formation of pits 26 of the main information signal along the plane track path and has no stylus guide groove formed. With respect to one track turn $t_1$, in every horizontal scanning period (H) at a position corresponding to the horizontal blanking period, pits 27 of the first pilot signal fp1 are formed on one lateral side of the track as viewed in the track path direction. Pits 28 of the second pilot signal fp2 are formed on the other side of the track.

Figure 2:
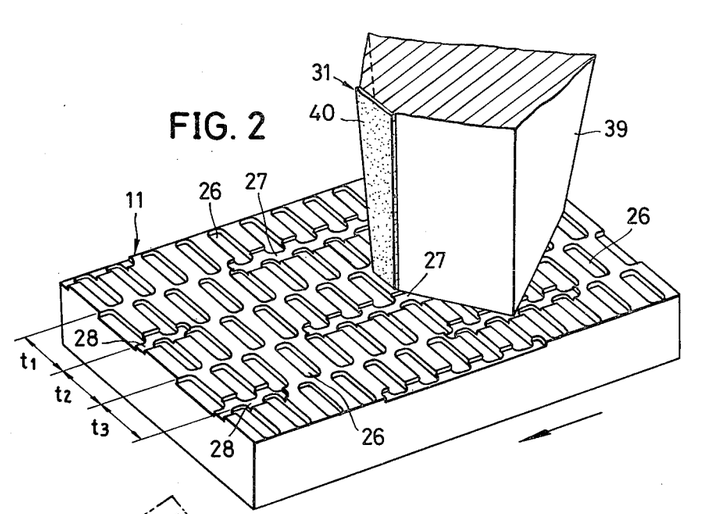
FIG. 2 is a perspective view, on a large scale, showing a part of a rotary recording medium together with a tip part of a reproducing stylus.

In the middle position between the centerlines of adjacent track turns, only pits of either one kind of the pits 27 and 28 of the above mentioned reference signals fp1 and fp2 are formed, and with respect to one track. Moreover, the sides on which the pits 27 and 28 are formed are alternated for every track turn. That is, if pits 27 and 28 are respectively formed on the right and left sides, for example, of one track turn, pits 28 and 27 will be respectively formed on the right and left sides of each of the adjacent track turns. The third pilot signal fp3 is recorded at a predetermined position on each track turn. This predetermined position is at a selected location which corresponds to the vertical blanking period of the recorded video signal. Pits of the third pilot signal fp3 are not shown in the drawings. The third pilot signal fp3 is used for switching the reproduced first and second pilot signals fp1 and fp2 as described hereinafter. Those pilot signals are disclosed in more detail in the above described prior applications.

Figure 3:
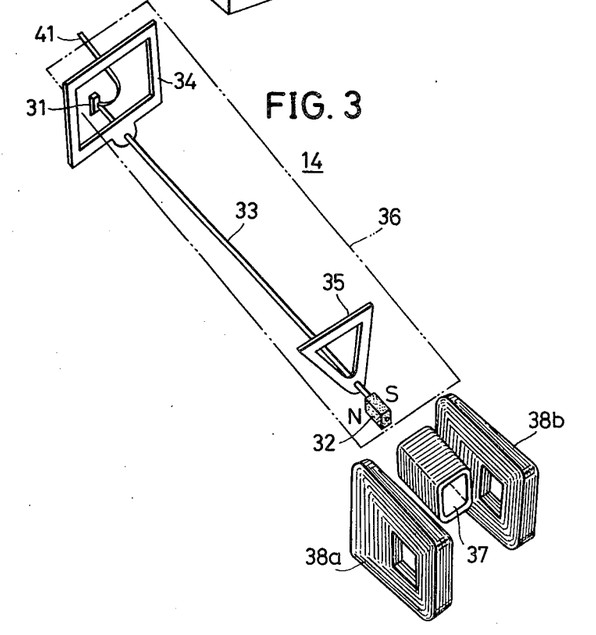
FIG. 3 is an exploded perspective view showing a part of an example of a signal pickup device as a reproducing transducer in a reproducing apparatus indicated in FIG. 1.

One example of the signal pickup device 14 indicated in FIG. 1 will now be described with reference to FIG. 3. This pickup device 14 has a relatively long cantilever arm 33 with a reproducing stylus 31 at its distal free end and a permanent magnet member 32 at its proximal root end. This cantilever arm 33 is supported near its free end by a damper 34. Arm 33 is held near its root part by a damper 35. Both of these dampers 34 and 35 are fixed to the lower surface of a substantially horizontal support plate 36. The damper 35 may be omitted.

The support plate 36 is fitted in and held by a holding structure. On the lower surface of plate 36 are fixed a coil 37, for tracking, and a pair of coils 38a and 38b for jitter compensation. These coils 38a and 38b are disposed on opposite sides of the tracking coil 37. The above mentioned permanent magnet member 32 is fitted within the tracking coil 37 with gaps therebetween.

Otherwise, the tracking control mechanism of the reproducing transducer may be a mechanism as disclosed in the specification of the U.S. patent application Ser. No. 841,531 filed on Oct. 11, 1977 now U.S. Pat. No. 4,152,727, issued May 1, 1979.

The reproducing stylus 31 has a tip with a configuration as indicated in FIG. 2. The reproducing stylus 31 is constituted by a stylus structure 39 and having a disc tracing surface which has a width greater than a track width, and an electrode 41 fixed to the rear face of the stylus structure 39. The electrode 40 is connected with a metal ribbon 40, as indicated in FIG. 3. As the reproducing stylus 31 traces along a track on the disc 11, rotating in the direction indicated by arrow, the video signal recorded thereon by a variation of pits is reproduced responsive to variations in the electrostatic capacitance between the surface of the disc 11 and the electrode 40 of the reproducing stylus 31.

Next, a first embodiment of the high-speed reproducing system of the present invention is described with reference to FIG. 4.

Figure 4:
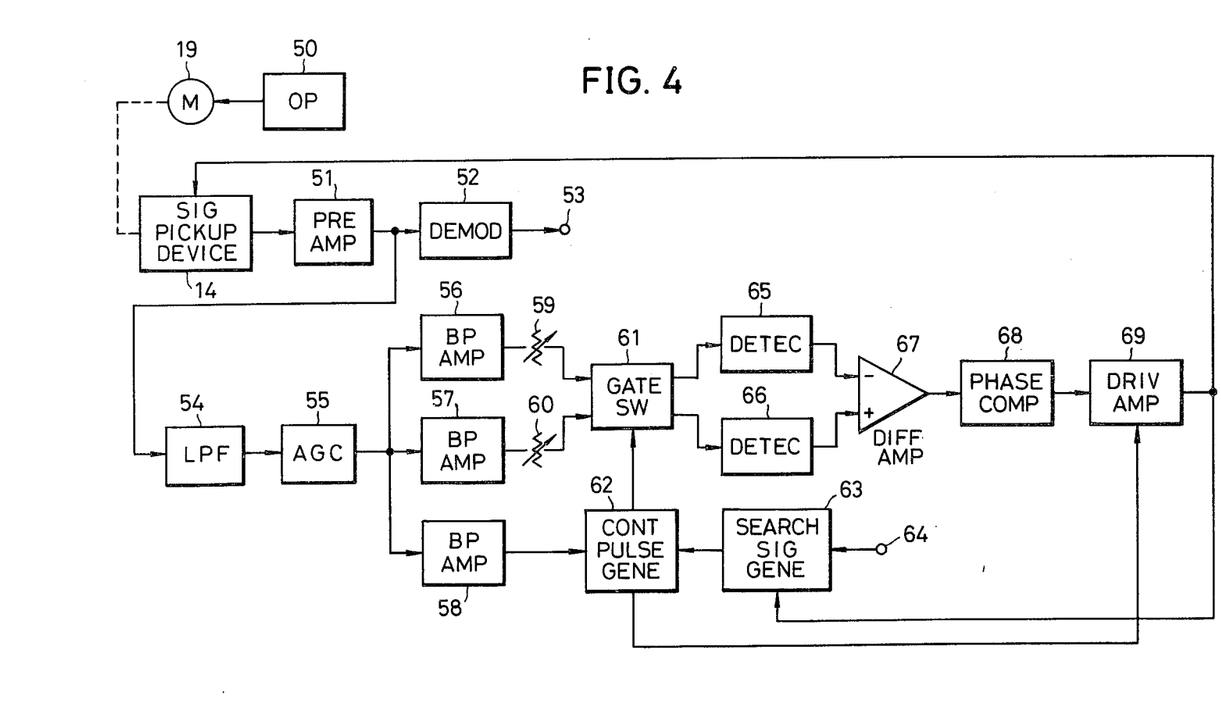
FIG. 4 is a block diagram of a first embodiment of a high-speed reproducing system in an apparatus for reproducing information signals recorded on a rotary recording medium.

In the system shown in FIG. 4, a reproduced signal picked up from the disc 11, as minute variations of electrostatic capacitance, by the reproducing stylus 31 of the signal pickup device 14 is supplied to a preamplifier 51 having a resonant circuit. The resonant frequency varies in response to this variation in electrostatic capacitance and is formed into a signal of a desired level. The resulting output of the preamplifier 51, is demodulated into the original information signal by a demodulator 52 and is sent out as an output through an output terminal 53.

The output signal of the preamplifier 51 is supplied to a lowpass filter 54 wherein the reference signals fp1, fp2, and fp3 are separated. The output reference signals pass through an automatic gain control circuit 55 and are supplied respectively to amplifiers 56, 57, and 58. Here, each of the amplifier 56, 57, and 58 is a kind of band-pass amplifier. The amplifiers 56, 57, and 58 are respectively designed to have steep passing frequency characteristics at only the frequency fp1, fp2, and fp3. As a result, the signals of frequencies fp1 and fp2 are obtained separately from the amplifiers 56 and 57, respectively. These signals respectively pass through level adjustors 59 and 60, where their levels are adjusted. The resulting signals are then supplied to a gate switching circuit 61. These reproduced signals fp1 and fp2 are pulse trains respectively having periods corresponding to 2H (2 horizontal scanning periods). Moreover, they have a coinciding phase in the horizontal blanking period of the reproduced video signal.

The signal fp3 which is separated and amplified in this bandpass amplifier 58 is supplied to a control pulse generating circuit 62, where it is formed into a switching pulse. The switching pulse is applied to the gate switching circuit 61.

The gate switching circuit 61 switches the signals fp1 and fp2 after every revolution period of the disc 11, with switching being completed in response to the applied switching pulses. The disc rotational speed in the present embodiment of the invention is 900 rpm. as mentioned hereinbefore. Therefore, two frames of the video signal are recorded for each revolution of the disc 11. The switching pulse applied to the gate switching circuit 61 has inverting polarities which change every two frames (1/15 second). As a result, the gate switching circuit 61 switches alternately the connections of the level adjustor 59 and a detecting circuit 65 and the level adjustor 60 and a detecting circuit 66, and the connections of the level adjustor 59 and the detecting circuit 66 and the level adjustor 60 and the detecting circuit 65.

The detecting circuits 65 and 66 detect the envelopes of their respective input reference signals and convert the envelopes into DC voltages. These voltages are then supplied to a differential amplifier 67. This differential amplifier 67 compares the output signals of the two detecting circuit 65 and 66 which vary in response to the reproduced levels of the signals fp1 and fp2. This generates an output tracking error signal which indicates the tracking error direction and the error quantity. This error signal passes through a phase compensation circuit 68 and is further amplified to a specific level by a driving amplifier 69. Then, it is applied to the tracking coil 37 of the signal pickup device 14 as a control signal to control it. As a result, the permanent magnet 32 undergoes a displacement within the coil 37, and, in conformity with this, the cantilever 33 also undergoes a displacement, whereby the reproducing stylus 31 is tracking controlled so that the above mentioned tracking error signal becomes zero, that is, so that the stylus 31 traces correctly the track of the disc 11. Normal reproduction is thereby carried out.

Next, the high-speed reproduction by the system of the present invention will be described. At the time of high-speed reproduction, the operator pushes a forward or backward high-speed reproduction button in an operation control section 50 thereby to cause the motor 19 to rotate at a speed which is higher than the rotational speed which is used for normal reproduction. Accordingly, the carriage 15 and the signal pickup device 14 are fed over the disc 11 with movement in the radial direction, at a speed which is higher than the pickup movement speed used at the time of normal reproduction. A signal indicative of the feed direction in response to whether the feed of the signal pickup device 14 is forward (i.e., from the outer periphery of the disc toward its inner side) or whether it is backward (i.e., from the inner side of the disc toward its outer periphery), as commanded by the operation control section 50, is supplied therefrom through a terminal 64 to a search signal generating circuit 63. On the other hand, a tracking control signal produced as output from the driving amplifier 69 is also supplied to this search signal generating circuit 63.

Figure 5:
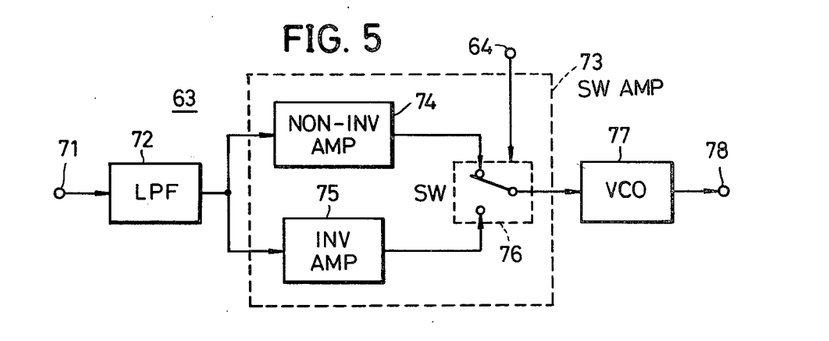
FIG. 5 is a block diagram of one embodiment of a search signal generating circuit shown in FIG. 4.

This search signal generating circuit 63 has a circuit, for example, as shown in FIG. 5. The tracking control signal from the driving amplifier 69 is introduced into this circuit through a terminal 71 and supplied to a low-pass filter 72. This low-pass filter 72 has a cut-off frequency of a value which is lower than the rotational frequency of the disc 11. For example, in the case where the disc 11 is being rotated at 900 rpm., its rotational frequency is 15 Hz, and the low-pass filter 72 has a filtering characteristic for passing essentially the DC component of 10 Hz or a lower frequency, for example. This DC component indicates the quantity of deviation and the direction of deviation from the neutral position of the cantilever.

Figure 7A:
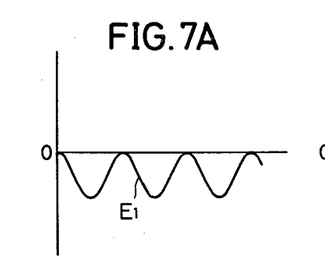
FIGS. 7A and 7B are graphs respectively showing waveforms of tracking control signals corresponding to the deviations of the cantilever shown in FIGS. 6A and 6B.
Figure 7B:
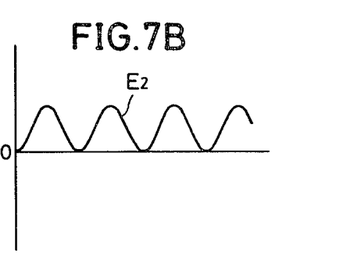
Figure 8:
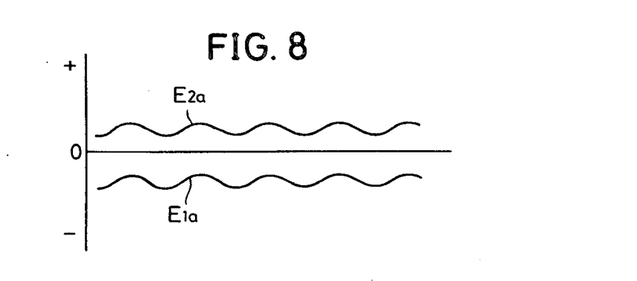
FIG. 8 is a graph showing DC components of the tracking control signals shown in FIGS. 7A and 7B.

More specifically, the signal pickup device 14 is being fed at high-speed in the radial direction over the disc 11, but the reproducing stylus is being subjected to tracking control so that it will trace the same track. For this reason, the cantilever 33 deviates as indicated by full line from the neutral position as indicated by broken line in FIGS. 6A and 6B. The tracking control signals obtained from the driving amplifier 69 at this time are as indicated in FIGS. 7A and 7B. When these tracking control signals are supplied to the low-pass filter 72, DC component signals are obtained as indicated at E1a and E2a in FIG. 8. The absolute values of these DC component signals E1a and E2a indicate the quantities of deviation of the cantilever 33 from the neutral position, while the sign, positive or negative, thereof indicates the deviation direction.

The DC component signals from the low-pass filter 72 are supplied to a non-inverting amplifier 74 and to an inverting amplifier 75 of a switching amplifier 73. The output sides of these amplifiers 74 and 75 are connected respectively to two fixed contacts of a changeover switch 76, the movable contact of which is switched by the feed direction signal supplied through the terminal 64. Thus, in accordance with the feed direction of the signal pickup device 14, a DC component signal which has been amplified without being inverted in the non-inverting amplifier 74 or a DC component signal which has been inverted and amplified is selectively obtained from the non-inverting amplifier 74 or the inverting amplifier 75 and is supplied to a voltage-controlled oscillator (hereinafter referred to as VCO)77.

Even when the direction of deviation of the cantilever 33 from the neutral position is the same, it is necessary that the modes of variation (increasing variation or decreasing variation) of the frequency of a search signal described hereinafter be opposite for the case wherein the signal pickup device 14 is being fed inwardly from the outer periphery of the disc and for the case wherein it is being fed in the opposite direction. It is for this reason that the above mentioned changeover switch 76 is employed.

Figure 6A:
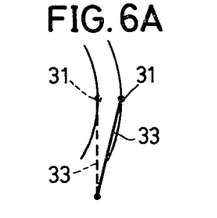
FIGS. 6A and 6B are diagrams respectively illustrating deviations of a stylus supporting cantilever arm.

This will be described more fully with respect to the case where, for example, the cantilever 33 is deviating on the outer periphery side from the neutral position as indicated in FIG. 6A. In this case, when the signal pickup device 14 is being fed inward from the disc outer periphery, the reproducing stylus 31 is in a position which is lagging or retarded, with respect to the feeding direction, from a reference position corresponding to the neutral position of the cantilever 33. In this case, therefore, it is necessary that the search signal be one of a high frequency. However, even in the case where the cantilever 33 is deviating on the same side as mentioned above, when the signal pickup device 14 is being fed outwardly toward the disc outer periphery, the reproducing stylus 31 is at a position which is advanced further in the feeding direction from the above mentioned reference position. In this case, therefore, it is necessary that the search signal have a low frequency. Therefore, even with the same DC component signal, it is necessary to supply it to the VCO 77 with a polarity in accordance with the feeding direction of the signal pickup device 14.

The VCO 77 produces an oscillation output signal whose frequency varies in response to the magnitude and polarity of the DC component signal supplied thereto. This oscillation output of the VCO 77 is supplied through a terminal 78 to the aforedescribed control pulse generating circuit 62. For example, in a case where 10-200 times high-speed reproduction is being carried out, the VCO 77 produces the output oscillated signal having a frequency of 150 Hz-3 KHz.

Figure 9:
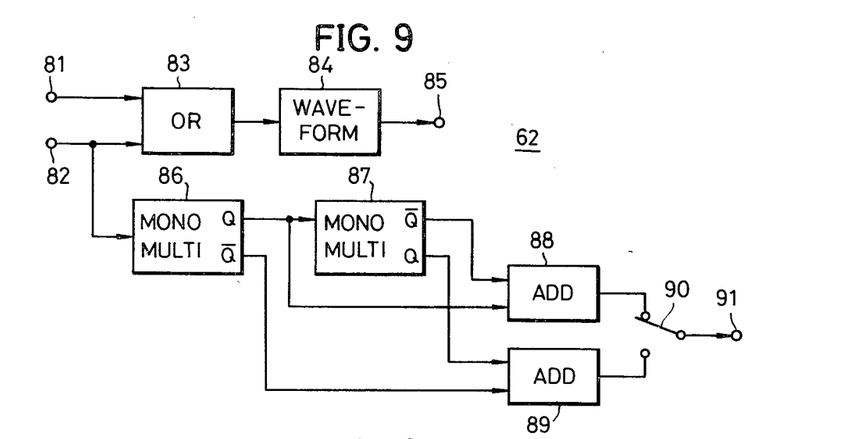
FIG. 9 is a block diagram showing a function of a circuit of one embodiment of an essential part of a control pulse generating circuit shown in FIG. 4.

The essential parts of this control pulse generating circuit 62 have a circuit and function as indicated in FIG. 9, for example. A pilot signal fp3 is sent from the amplifier 58 and introduced through a terminal 81, from which it is supplied through an OR circuit 83 to a waveform shaping circuit 84, where its waveform is shaped, and then it is applied as a switching signal through a terminal 85 to the gate switching circuit 61 (FIG. 4).

Figure 10:
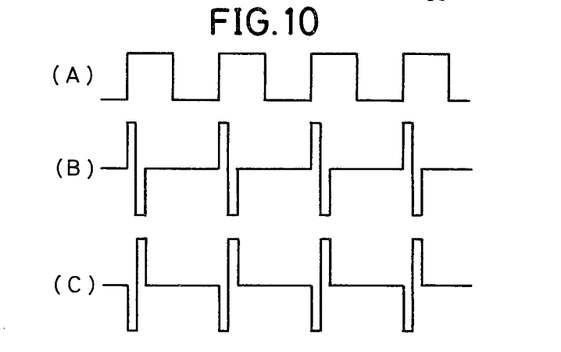
FIGS. 10(A), 10(B), and 10(C) are graphs respectively showing waveforms of signals at various parts in the block diagram shown in FIG. 9.

The oscillation signal has the waveform indicated in FIG. 10 (A) and is produced as output from the VCO 77 (FIG. 5) of the search signal generating circuit 63. This signal is applied, as a search signal, to a terminal 82. The signal applied to the terminal 82 passes through the OR circuit 83 and is formed by the waveform shaping circuit 84 into a gate switching signal, which is applied to the gate switching circuit 61 (FIG. 4). The signal applied to the terminal 82 is also applied to trigger a monostable multivibrator 86. This monostable multivibrator 86 thereupon produces a Q output which is supplied to a monostable multivibrator 87 and to an adder 88 and a $\overline{Q}$ output which is supplied to an adder 89. The Q and $\overline{Q}$ outputs of the monostable multivibrator 87 are supplied to the adders 89 and 88 respectively. The adders 88 and 89 respectively produce output shift pulses of waveforms indicated in FIGS. 10(B) and 10(C).

A changeover switch 90 has fixed contact points connected respectively to the output sides of the adders 88 and 89 and is switched in accordance with the direction in which the reproducing stylus 31 should be shifted. For example, in the case where the reproducing stylus 31 is to be shifted toward the inner side of the disc, the switch 90 is switched so that the output shift pulses of the adder 88 are transmitted through the switch 90. In the case where the reproducing stylus is to be shifted toward the disc outer periphery, the switch 90 is switched so that the output shift pulses of the adder 89 are transmitted through the switch 90. In either case, the output shift pulses are led out through an output terminal 91 and applied to the aforedescribed driving amplifier 69 (FIG. 4).

These shift pulses are thus passed through the driving amplifier 69 and applied to the coil 37 for controlling the tracking of the signal pickup device 14. The shift pulse has a frequency which is higher than the frequency 60 Hz of one field of the video signal. Accordingly, the reproducing stylus 31 is shifted to succesively adjacent track turns at a rate of one track turn for every application of a shift pulse after the reproducing stylus 31 reproduces a part of the track which is smaller than the track part corresponding one field of the video track. Since the frequency of the cyclic repetition of the shift pulses corresponds to the oscillation frequency of the VCO 77, the reproducing stylus 31 is shifted to successively adjacent track turns with a repetitive frequency in accordance with the deviation of the stylus 31 and the cantilever 33 from the neutral position.

Accordingly, the reproducing stylus 31 traces partially each track turn, as it is tracking controlled, in accordance with the feeding speed in the disc radial direction of the carriage 15 driven by the motor 19 and the signal pickup device 14. At the same time, the stylus is shifted to successively adjacent track turns, thus following up with respect to the feeding movement of the carriage 15 and the signal pickup device 14.

In this operation, simultaneously with the shifting of the reproducing stylus 31 from one track turn to the adjacent track turn, in response to the generation of a shift pulse, the gate switching circuit 61 carries out a switching in response to a gate switching pulse. For this reason, although the left and right side positions of the pilot signals fp1 and fp2 for each track turn are exchanged every time the reproducing stylus 31 is shifted by one track turn, these pilot signals fp1 and fp2 are changed over and supplied in the normal manner to the detection circuits 65 and 66 because of the above described switching.

When the specifically desired image is reached, the operator observes the picture being reproduced by the reproducing stylus 31. The operator releases the high-speed reproducing button of the operation control section 50, whereupon the signal pickup device 14 either stops its feeding travel, at that position, or carries out normal reproduction from that position. Since the reproducing stylus 31, while being tracking controlled, is reproducing partially each track turn at times other than the times when it is being shifted to an adjacent track turn, a high-speed reproduced image of good quality is obtained without image disturbance.

In an interval of 0.2 to 0.3 milliseconds in which the reproducing stylus 31 is being shifted to an adjacent track turn, noise is generated. However, since the position to which the stylus 31 is shifted is not always a definite position on each track turn but is a position determined in accordance with the oscillation frequency of the VCO 77, the above mentioned noise is not always generated at a specific position, but is irregular on the reproduced picture. Therefore, although the quantity of the reproduced picture is slightly inferior as a whole to that of the picture at the time of normal reproduction, the noise does not always appear strongly at any specific position and, therefore, is not especially conspicuous.

Figure 11:
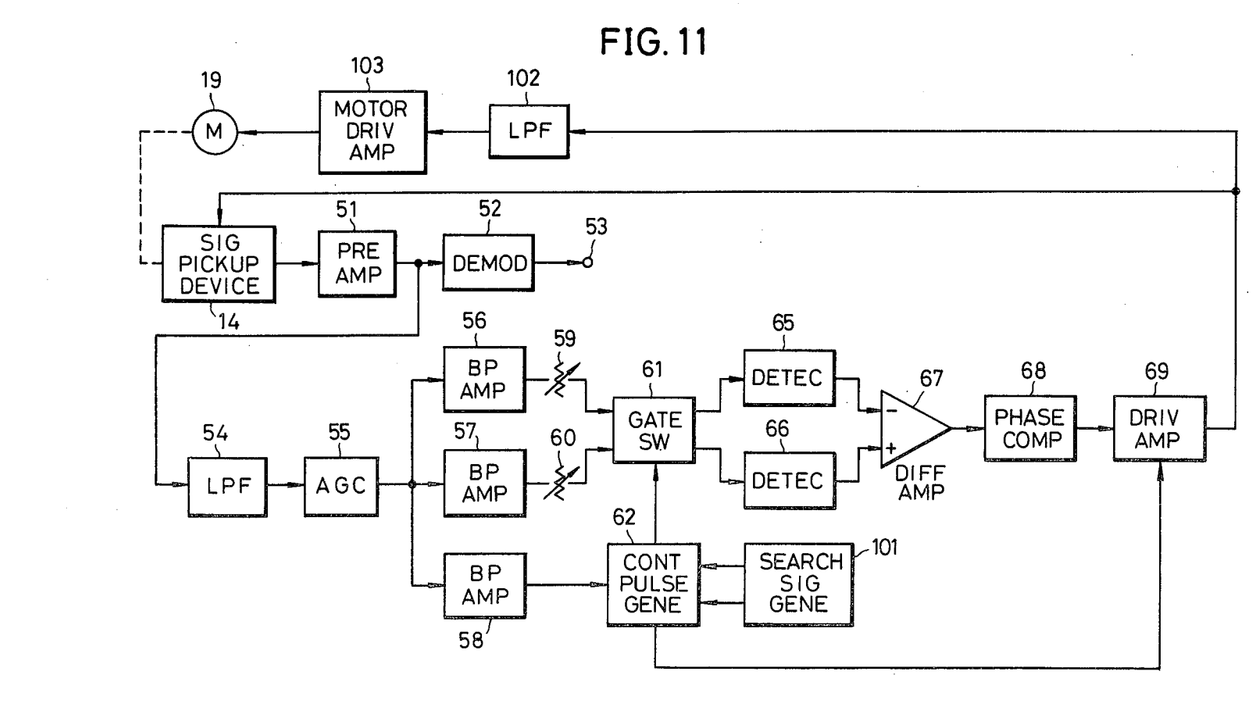
FIG. 11 is a block diagram of a second embodiment of the high-speed reproducing system in an apparatus for reproducing information signals recorded on a rotary recording medium.

The second embodiment of the high-speed reproducing system according to the present invention will now be described in conjunction with FIGS. 11 and 12. In FIG. 11, those parts which are the same as corresponding parts in FIG. 4 are designated by like reference numerals. The description of such parts will be omitted.

Figure 6B:
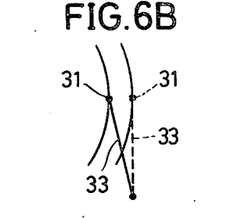

In this system, the tracking control signal is produced as an output by the driving amplifier 69 and is supplied to the coil 37 for controlling the tracking of the aforedescribed signal pickup device 14. At the same time, the signal is supplied to a low-pass filter 102. This low-pass filter 102 filters out the DC component in the tracking control signal from the driving amplifier 69, which is similar to the operation of the low-pass filter 72 in the search signal generating circuit 63, of the first embodiment of the invention. This DC components, as indicated in FIGS. 6A and 6B, is a signal which is responsively corresponding to the quantity and direction of the deviation of the cantilever 33 and the reproducing stylus 31 from the neutral position.

The output signal of the low-pass filter 102 is amplified by a motor driving amplifier 103 and then is applied to the motor 19 to control the rotational speed thereof. In the case where the cantilever 33 is deviating (as indicated by full line in FIGS. 6A and 6B) from the neutral position as indicated by a broken line, the rotation of the motor 19 is controlled to cause the carriage 15 and the signal pickup device 14 to be fed in a manner which reduces this deviation to zero, that is, to restore the cantilever 33 to the neutral state. This control loop is described in detail in the specification of U.S. patent application Ser. No. 973,688 filed Dec. 27, 1978, entitled "Reproducing transducer feeding device in a rotary recording medium reproducing apparatus" now U.S. Pat. No. 4,247,741, issued Jan. 27, 1981.

Figure 12:
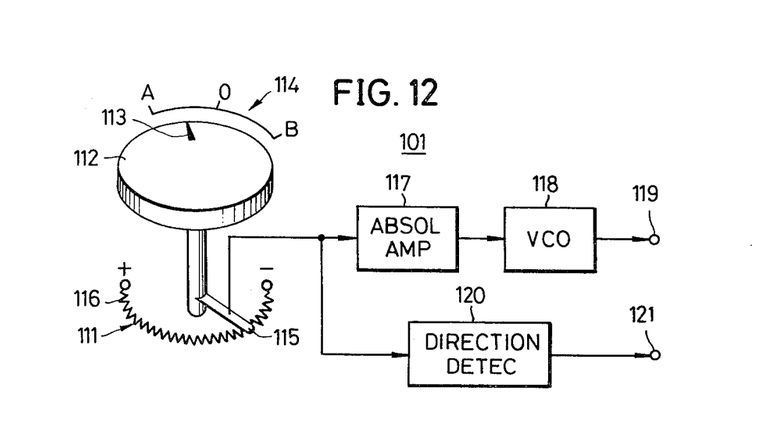
FIG. 12 is a block diagram of one embodiment of a search signal generating circuit shown in FIG. 11.

A search signal generating circuit 101 of a circuit organization as indicated in FIG. 12, for example, is used in the system of the present embodiment of the invention. At the time of normal reproduction, the knob 112 of a variable resistor 111 is kept at an angular position where its pointer mark 113 is in register with the zero point of an indicator dial plate 114, and no output signal is produced by the search signal generating circuit 101.

For high-speed reproduction, for example, in the case where the signal pickup device 14 is to be fed inwardly from the outer periphery of the disc, the knob 112 is turned so that the pointer mark 113 is pointing at a position between "O" and "A" on the indicating dial plate 114. In the case where the signal pickup device 14 is to be fed outwardly from the inner part of the disc toward the outer periphery thereof, the pointer mark 113 is placed between "O" and "B". Together with the rotation of the knob 112, a sliding contact 115 of the variable resistor 111 slides unitarily over a resistance structure 116 connected at its two ends respectively to the positive and negative voltage sources.

A positive or negative voltage of a value corresponding to the position at which the sliding contact 115 has been thus placed on the resistance structure 116 is thereby led out through the sliding contact 115 and applied to an absolute-value amplifier 117 and a direction detector 120. The absolute value of positive or negative voltage led out increases with the angle of departure of the pointer mark 113 from the indication "0". The absolute-value amplifier 117 amplifies the absolute value of the voltage applied thereto and supplies it to a voltage-controlled oscillator (VCO) 118. This VCO 118 thereupon produces an output signal of a frequency, responsive to the voltage supplied thereto. This output oscillation signal, of a waveform as indicated in FIG. 10(A), is supplied via a terminal 119 to the control pulse generating circuit 62.

The direction detector 120 discriminates the polarity (positive or negative) of the voltage applied thereto and produces a polarity discrimination output signal, which is supplied through a terminal 121 to the control pulse generating circuit 62. In the control pulse generating circuit 62 illustrated in FIG. 9, the switch 90 is switched in changeover action in response to this polarity discrimination signal.

Thus, when the knob 112 is turned, shift pulses of a repetition frequency or pulse-recurrence frequency and a polarity corresponding to the angle and direction of the rotation of the knob 112 are generated by the control pulse generating circuit 62 and are supplied to the driving amplifier 69. Accordingly, as a result of the turning of the knob 112, the reproducing stylus 31 in the signal pickup device 14 is compulsorily shifted to an adjacent track turn by one track turn every time one of these shift pulses is applied.

However, when the reproducing stylus 31 is thus shifted and deviates from the neutral position as indicated in FIGS. 6A and 6B, a DC component corresponding to the quantity and direction of this deviation is obtained from the low-pass filter 102. Accordingly, the rotation of the motor 19, to which this output is applied, is so controlled as to cause the carriage 15 and the signal pickup device 14 to be fed in a manner to follow up the shifting of the stylus 31 and thereby to maintain the successively shifted stylus 31 and the cantilever 33 in the neutral state.

Therefore, in this second embodiment of the invention, the reproducing stylus 31 is successively shifted and transferred from track turn to adjacent track turn in a tracking controlled state. The signal pickup device 14 is fed in a manner to follow this movement with the result that a good high-speed image is obtained somewhat as described in the first embodiment of the invention. When, as the operator observes the high-speed reproduced image, the specific image is searched, he turns the knob 112 to bring the pointer mark 113 into coincidence with the indication "O".

Further, this invention is not limited to these embodiments but variations and modifications may be made without departing from the scope of the invention.

What I claim is:

1. A high-speed reproducing system for use in an apparatus for reproducing signals from a rotary recording medium having an information signal recorded in a track formed thereon in a spiral path or a concentric circular form and having reference signals recorded thereon interrelatedly with an information signal track, the signals being reproduced at a speed which is in the range of approximately 10 to 200 times the speed which is used during normal reproduction, said high-speed reproducing system comprising:
    reproducing transducer means having a reproducing element for reproducing the information signal and the reference signals recorded on the rotary recording medium, and tracking control means for accomplishing a tracking control so that the reproducing element traces the information signal track;
    feeding means for moving the reproducing transducer means in a feeding travel over the rotary recording medium, with movement of said reproducing transducer means being in the radial direction thereof;
    means for producing a tracking control signal in response to the reference signals reproduced by the reproducing transducer means and for supplying the tracking control signal to the tracking control means; and
    shift pulse generating means for generating a train of shift pulses having a desired repetitive frequency, said repetitive frequency arbitrarily varying a search speed, and for supplying the shift pulses thus generated to the tracking control means,
    said reproducing element being shifted sequentially to trace an adjacent track every time said shift pulse is supplied to the tracking control means,
    said shift pulse generating means having variable oscillation means for producing an oscillating signal having a frequency which is varied in response to a voltage applied thereto, and means for waveshaping an output signal of said variable oscillation means into said shift pulses, said shift pulses being a continuous train of pulses which are not related to blanking signals within the video signal.

2. A high-speed reproducing system for use in an apparatus for reproducing signals from a rotary recording medium having an information signal recorded in a track formed thereon in a spiral path or a concentric circular form and having reference signals recorded thereon interrelatedly with an information signal track, said high-speed reproducing system comprising:

reproducing transducer means having a reproducing element for reproducing said information signal and said reference signals recorded on said rotary recording medium, and tracking control means for accomplishing a tracking control so that said reproducing element traces said information signal track;

feeding means for moving said reproducing transducer means in a feeding travel over said rotary recording medium, with movement of said reproducing transducer means being in the radial direction thereof;

means for driving said feeding means so that the reproducing transducer means is fed at a speed which is higher than the normal speed used when the reproducing transducer means is fed a track pitch at a time at the end of every revolution of the rotary recording medium;

means for producing a tracking control signal in response to said reference signals which are reproduced by said reproducing transducer means and for supplying said tracking control signal to said tracking control means; and shift pulse generating means having means for deriving a DC component of the tracking control signal, means for generating an oscillating signal having a frequency which is varied in response to the DC component applied thereto, means for forming a train of shift pulses having a repetitive frequency in response to the frequency of an output signal of the oscillating signal generating means, and means for supplying said shift pulses to said tracking control means, said reproducing element being shifted sequentially to trace an adjacent track every time said shift pulse is supplied to said tracking control means.

3. A high-speed reproducing system as claimed in claim 2 in which said shift pulse generating means further comprises non-inverting amplification means for amplifying the derived DC component while in a non-inverted state, inverting amplification means for amplifying the derived DC component while in an inverted state, and switching means for selectively supplying an output of the non-inverting amplification means and an output of the inverting amplification means to the oscillating means in a selectively switched state in response to a feeding direction of the reproducing transducer means on the rotary recording medium.

4. A high-speed reproducing system for use in an apparatus for reproducing signals from a rotary recording medium having an information signal recorded in a track formed thereon in a spiral path or a concentric circular form having reference signals recorded thereon interrelatedly with an information signal track, said high-speed reproducing system comprising:

reproducing transducer means having a reproducing element for reproducing said information signal and said reference signals recorded on said rotary recording medium, and tracking control means for accomplishing a tracking control so that said reproducing element traces said information signal track;

feeding means for moving said reproducing transducer means in a feeding travel over said rotary recording medium, with movement of said reproducing transducer means being in the radial direction thereof;

means for producing a tracking control signal in response to said reference signals reproduced by said reproducing transducer means and for supplying said tracking control signal to said tracking control means;

shift pulse generating means for generating a train of shift pulses having a desired repetitive frequency, and for supplying said generated shift pulses to said tracking control means;

means for deriving a DC component of the tracking control signal; and means for controlling the feeding means so that the reproducing transducer means is fed at a speed responsive to the derived DC component, said reproducing element being shifted sequentially to trace an adjacent track every time said shift pulse is supplied to said tracking control means, said shift pulse generating means having variable voltage supplying means for supplying a variable voltage having a desired polarity and value, oscillator means for generating a signal having an oscillating frequency which is varied in response to the variable voltage applied thereto, and means for forming the train of shift pulses having the repetitive frequency in response to the frequency of the oscillator means.

5. A high-speed reproducing system as claimed in claim 4 in which said variable voltage supplying means have positive and negative voltage sources, a variable resistor connected to the voltage sources, and a knob for varying the resistance value of the variable resistor, and said shift pulse generating means further have discriminating means for discriminating the polarity of the voltage supplied from the variable resistor and forming said shift pulses having a polarity responsive to an output of the discriminating means.

6. A high-speed reproducing system as claimed in any one of the claims 1, 2 or 4 in which said information signal is a video signal comprising field signals, and said shift pulses have a frequency which is higher than the frequency of the field signals.

* * * * *